United States Patent Office 3,672,972
Patented June 27, 1972

3,672,972
METHOD FOR FORMING ANODIC OXIDE COATINGS HAVING IMPROVED ADHESIVE PROPERTIES
Geoffrey A. Dorsey, Jr., Danville, Calif., assignor to Kaiser Aluminum & Chemical Corporation, Oakland, Calif.
No Drawing. Continuation-in-part of application Ser. No. 707,962, Feb. 26, 1968. This application Mar. 23, 1970, Ser. No. 22,022
Int. Cl. C23b 9/02
U.S. Cl. 204—58
1 Claim

ABSTRACT OF THE DISCLOSURE

A method for improving the adhesive bond between an aluminum surface and other materials comprising pretreating the aluminum surface by anodizing in an acidic electrolyte in such as manner that an initially formed anodic oxide layer dissolves at about the same rate at which it is being formed and pseudoboehmite is formed in the oxide coating that remains on the aluminum surface.

BACKGROUND

Although aluminum is a corrosion resistant and attractive metal, it is frequently desirable to coat it with another material. These coatings may be organic coatings such as paint, lacquers, and varnishes, or inorganic coatings such as vitreous or porcelain enamels. It may also be desirable to bond materials such as plastics or foams to aluminum, or to bond aluminum articles together with organic adhesives. In all of these applications it is desirable to treat the surface of the aluminum so that the coating material will adhere strongly to the aluminum. The term aluminum as used in this specification and in the following claims is intended to include both pure aluminum and aluminum base alloys.

It has long been known that aluminum articles may be treated by a process that is generally referred to as anodizing. In the anodizing process the aluminum article is made the anode in an electric circuit which includes the anode, an electrolyte, and a cathode. This process usually employs a direct current with a voltage being impressed between the aluminum anode and an inert cathode such as lead or stainless steel. When the electric current is passed through such a circuit, the article becomes coated with an anodic aluminum oxide coating which is different from a naturally-formed oxide coating. The anodic oxide has a lustrous, glass-like appearance and can be formed substantially thicker than the naturally-occurring oxide. Furthermore, various anodic aluminum oxides can be formed, many with a different molecular structure than the naturally-occurring oxide. Anodic aluminum oxide may be formed with inherent colors or other characteristics that improve the appearance of the metal article.

Aluminum oxide occurs in many forms with greater or lesser degrees of complexity. Aluminum oxide may by anhydrous; it can exist in various states of hydration; and it can exist in polymer form. The various forms of aluminum oxide have characteristics that range from the properties of dead-burned aluminum oxide employed as a component in refractory brick to activated alumina which is used to adsorb large quantities of gas or acts as a component of a catalyst.

One form of aluminum oxide, known as pseudoboehmite, is a highly active form which differs slightly in structure from boehmite. From infrared absorption studies, the pseudoboehmite family apparently contains a double bond between the aluminum and oxygen which can be detected within the IR region 1300 to 1500 cm.$^{-1}$ in the bulk oxide. Pseudoboehmites in general also have lower crosslinking properties than normal anodic aluminum oxides. Pseudoboehmite is so active that it reacts with, or at least strongly associates with many other materials, and is therefore capable of forming a strong bond between these materials and an aluminum substrate as is discussed in U.S. Pat. No. 2,915,475 issued to Bugosh. In the Bugosh process, pseudoboehmite is formed separately from the aluminum article and then coated on the article; this process requires high temperatures which affect temper of heat-treated or work-hardened aluminum.

DESCRIPTION OF THE INVENTION

This application is a continuation-in-part of copending application Ser. No. 707,962 now abandoned, filed Feb. 26, 1968.

It is an object of the present invention to improve the adhesive qualities of anodized aluminum articles by forming pseudoboehmite directly on the aluminum article being coated by an anodic oxidation process. The process of this invention has several advantages. First, at least one processing step is elimiated because pseudoboehmite is formed directly on the aluminum article at the anode. More important, the pseudoboehmite is firmly bonded More important, the pseudoboehmite is to an oxide layer on the aluminum surface and can be formed on the aluminum as a very thin and uniform layer, substantially thinner than by nonanodic processes, thereby gaining all the advantages of the bonding effect of pseudoboehmite, without the low strength characteristic of thick-layered, nonanodic oxide powders.

Pseudoboehmite produced in an anodizing electrolyte in accordance with the present invention is indistinguishable from pseudoboehmite formed by nonanodizing methods in that both types exhibit absorption peaks in the same IR regions.

To determine whether or not pseudoboehmite is deposited on the surface of the anodized layer, two tests were devised in which agreement is shown to be 100 percent conclusive. The easier test involves the use of a standard adhesive tape such as No. 6 Scotch Brand cellophane tape applied to the anodic oxide surface. If the adhesive on the tape adheres to the oxide layer when the tape is peeled back from the anodized coating, then pseudoboehmite is present. However, if no adhesive is present on the anodized coating when the tape is removed, pseudoboehmite is not present on the oxide surface.

The alternate test for surface detection of pseudoboehmite makes use of the ATR technique for surface examination by infrared. With such a technique, time-consuming procedures are required. Nevertheless, a one-to-one correlation is achieved between positive and negative tape test results and the independent ATR infrared examination. The tape test is more conveniently utilized and is solely employed in most cases unless the results are questionable.

In accordance with this invention, certain acids are employed for anodizing, many of which have long been known as acids suitable for producing porous anodic oxide coatings. However, it is not the object of this invention to produce the typical porous anodic oxide coating, but rather an anodic coating containing pseudoboehmite. To obtain the desired pseudoboehmite coating that adapts the aluminum article for coating with another material, anodizing must be carried out only under selected conditions with acidic electrolytes. The useful electrolytes are those capable of exerting a dissolving action on the porous and barrier layer oxides, complexing or chelating aluminum and forming a soluble anion that contains aluminum and anodically dissociating to redeposit the aluminum in the form of pseudoboehmite at the anode.

Typically, short chain aliphatic dicarboxylic acids and polyfunctional aromatic acids have been found useful, but many others can be used as set forth below. In addition to employing an electrolyte capable of forming an aluminum containing anion, it is essential that anodizing be effected under conditions at which aluminum oxide is formed on the article; the barrier layer or the porous layer or both are dissolved rapidly in the electrolyte about as fast as they are being formed on the aluminum to supply aluminum to the electrolyte; and pseudoboehmite is deposited from the solution onto the anode. It is essential in the present invention that an initial oxide coating is formed prior to pseudoboehmite deposition at the anode; however, the initial oxide coating can previously be formed in another anodizing process.

The conditions which define the amount of anodic pseudoboehmite deposited on the aluminum article include: electrolyte concentration, solution temperature, current density and the total anodizing period. The conditions for producing anodic pseudoboehmite are different from conditions ordinarily employed for commercial anodizing because one of the criteria for operability in the process of this invention is that the porous coating, the typical anodic oxide coating, dissolves at about the same rate that it is formed. Furthermore, these conditions establish the required limits for producing thin anodized coatings containing pseudoboehmite rather than thick coatings as formed in commercial anodizing.

Generally, the current density for this invention ranges from about 5 amp/ft.$^2$ to about 30 amp/ft.$^2$. The total anodizing time ranges from about 1 to about 10 minutes, the total time being approximately inversely proportional to the current density, i.e. about 5 amp/ft.$^2$ for a period of about 10 minutes to about 30 amp/ft.$^2$ for a period of about 1 minute.

Typical electrolytes of the invention include aqueous solutions of oxalic acid, sulfuric acid, phosphoric acid, malonic acid, tris(oxalato)aluminic acid and mixtures of sulfosalicylic acid and sulfuric acid. The concentrations and temperatures necessary to form the desired oxide coatings are as follows:

| Acid | Concentration (grams per liter) | Temperature (° C.) |
| --- | --- | --- |
| Oxalic | 10–200 | 50–80 |
| Sulfuric | 100–300 | 30–80 |
| Phosphoric | 100–300 | 35–50 |
| Malonic | 10–200 | 70–100 |
| Tris(oxalato) aluminic | 10–200 | 20–90 |
| Sulfosalicylic/sulfuric | 50–150/1–40 | 40–80 |

The voltage required to maintain a current density between about 5 and about 30 amp/ft.$^2$ varies for each electrolyte and also upon the cell resistance due to the anode-cathode distance, resistance in lead lines, contact points and the like. The following are given as typical voltage values:

Acid: Volts
 Oxalic _____ 3–20
 Sulfuric _____ 1–10
 Phosphoric _____ 10–80
 Malonic _____ 20–40
 Tris(oxalato)aluminic _____ 3–20
 Sulfosalicylic/sulfuric _____ 30–70

Following are several examples which are presented to demonstrate some specific modes of depositing anodic pseudoboehmite on an aluminum article and the properties of the article so produced. These examples are intended to illustrate the invention rather than to limit it to any specific electrolyte or set of operating conditions.

Example 1

Example 1 is presented to demonstrate the improved adhesion between aluminum and various coating materials when the aluminum is treated in accordance with the process of this invention wherein a layer of pseudoboehmite is produced on the surface of the aluminum. Pseudoboehmite in the examples was identified by the tape test, and infrared analysis if warranted; and in all cases it was produced on aluminum articles that were cleaned and prepared for anodizing by conventional methods known to the anodizing art. In this example, and throughout the specification, aluminum alloy designations are those used by The Aluminum Association, and all analyses are on a weight percent basis.

Sheets of 1230 alloy were prepared for anodizing by conventional cleaning and surface preparation methods. A number of sheets of this alloy were anodized in both oxalic acid and sulfuric acid, and tested as set forth below.

Anodizing in oxalic acid was accomplished by placing the cleaned sheets in an aqueous electrolyte containing about 50 grams per liter of oxalic acid, connecting each as the anode in a cell that also contained an inert stainless steel cathode, and passing a direct current through the anode at a current density of 10 amp/ft.$^2$ for a period of 3 minutes. The oxalic acid electrolyte was maintained at 70° C. during the anodizing period.

Anodizing in sulfuric acid was carried out conventionally in a sulfuric acid batch containing about 170 grams per liter sulfuric acid at 20° C. Specimens anodized in sulfuric acid contained no pseudoboehmite in the anodic oxide film while the specimens anodized in oxalic acid were coated with an oxide layer that contained a large quantity of pseudoboehmite.

The anodized sheets were tested for adhesiveness by preparing them in panel form and placing half-inch wide strips of adhesive on the panels, then assembling the coated panels in a bonding jig with the adhesive side up, placing a second anodized panel over the adhesive-coated panel to overlap exactly one-half inch, and then curing the adhesive by placing the assembled panel and jig in a bonding press maintained at the curing temperature for the adhesive used. The bonded panels were then cut into one-inch wide specimens and tensile tested by standard methods. Below are the results of tests giving the average of at least 6 and as many as 10 specimens for each panel.

| Type of Adhesive | Tensile strength (lbs. per sq. inch) oxalic acid anodized | Tensile strength (lbs. per sq. inch) sulfuric acid anodized |
| --- | --- | --- |
| Rubber-based | 2,370 | 1,220 |
| Fiberglass supported epoxy-phenolic | 2,310 | 1,140 |
| Epoxy powder | 4,680 | 3,670 |
| Nitrile phenolic | 4,550 | 2,360 |

It may be seen from the above data that bonds involving panels coated with pseudoboehmite are substantially stronger than those involving ordinary anodized aluminum. A factor that is even more indicative of the bond strength is that all of the bonds involving pseudoboehmite-coated panels experienced cohesive failure, while the bonds involving sulfuric-acid-anodized panels experienced adhesive failure. Adhesive failure is a failure between the metal and the adhesive; whereas, cohesive failure is a failure within the bonding material or in the metal itself. In other words, the bond between pseudoboehmite and the adhesive was stronger than at least one of the materials being bonded.

Example 2

Example 2 is presented to illustrate that acids other than oxalic acid can be used to produce anodic pseudoboehmite on aluminum. In all cases, the anodic oxide films produced were analyzed by the tape test, and infrared absorption when warranted; the tests revealed that large quantities of pseudoboehmite were present.

In all cases of Example 2, 1100 aluminum was employed, which is commercially pure aluminum containing 99.0% aluminum and a maximum of 1.0% miscellaneous impurities. In the table below, the significant conditions and the identity of the electrolytes are set forth. In all cases, the aluminum was prepared for anodizing by conventional cleaning pretreatments.

| Electrolyte | Concentration (grams per liter) | Temperature (° C.) | Time (min.) |
|---|---|---|---|
| Malonic acid | 104 | 90 | 5 |
| Sulfosalicylic acid sulfuric acid | 100/5 | 50 | 5 |
| Phosphoric acid | 140 | 35 | 10 |
| Tris(oxalato) aluminic acid | 10 | 30 | 10 |
| Sulfuric acid | 200 | 40 | 10 |

Malonic acid, sulfosalicylic-sulfuric acid mixtures, phosphoric acid, and sulfuric acid are all well-known anodizing acids, but it is equally well known that at the temperatures and concentrations set forth in the above table the acids will not produce decorative and inert anodic oxide coatings. Tris(oxalato) aluminic acid is not a well-known anodizing acid, but one that was selected because it contains anionic aluminum and is representative of an oxalic acid electrolyte near the point of saturation with respect to dissolved aluminum ions.

Example 3

Example 3 illustrates that anodizing with phosphoric acid to produce pseudoboehmite results in a coating that is resistant to water. This is particularly important when the coated aluminum article is to be used in an environment where it is subject to submersion or high humidity for a prolonged period. In the description below, 1100 alloy was anodized at the indicated conditions and with conventional pretreatments preceding the anodizing. In all cases, the anodic oxide coating was analyzed by the tape test, and infrared if warranted to determine whether pseudoboehmite was present.

Specimens were anodized in phosphoric acid of about 140 grams per liter concentration and at 35° C. for 5 minutes at 10 amperes per square foot of current density, and were then dried and painted. These specimens were compared with others anodized in sulfuric acid of about 170 grams per liter concentration maintained at 20° C. for 5 minutes at 10 amperes per square foot. In the case of the aluminum articles anodized in oxalic acid and phosphoric acid, infrared analysis showed that a substantial amount of pseudoboehmite was present in the oxide coatings while the articles anodized in sulfuric acid contained no pseudoboehmite.

Such articles were painted and also tested by conventional testing procedures to determine the adhesion and flexibility of the paint, initially and after various degres of exposure to water. It was found that initially the paint, on the oxalic acid- and phosphoric acid-anodized specimens, was more adherent and flexible than the paint on the sulfuric acid-anodized specimens. The adhesion and flexibility of the paint were also measured after 1 hour immersion in boiling water, after 500 hours immersion in room temperature water, and after 500 hours of exposure to water fog. It was found that the bond strength and flexibility of the paint was substantially destroyed by water exposure in all cases on the sulfuric acid-anodized specimens; that it diminished beyond the point of usefulness with the oxalic acid-anodized specimens; but that the phosphoric acid-anodized specimens maintained adhesion with at least three-quarters of its initial bond strength after exposure to all of the above-described tests.

Although the foregoing examples illustrate various species of the invention, they are not intended to limit the invention to the specific materials or conditions set forth. As stated heretofore, the criteria for operation of this invention are such that an electrolyte must be used which is capable of providing anionic aluminum in solution; the electrolyte must be maintained at the proper concentration and temperature, and the current density must be such that the aluminum surface is anodized at about the same rate at which the anodic oxide is being dissolved into the electrolyte; and that pseudoboehmite is deposited at the anode. It is believed that the concentration of the anionic aluminum in the bulk electrolyte need not be at the saturation point in solution to deposit pseudoboehmite. Apparently, in the presence of an established electrical field (whose value is that of the applied voltage divided by the angstrom thickness of the primary phase barrier layer) in the particular acid electrolytes of the invention the complexed anionic aluminum moves into the immediate vicinity of the anode, and disassociates, resulting in the deposit of pseudoboehmite into the anodic oxide coating.

What is claimed is:

1. A method for forming an anodic oxide layer having improved adhesive properties on an aluminum article comprising subjecting said article to a direct current density between about 5 amps/ft.$^2$ for a period of about 10 minutes and 30 amps/ft.$^2$ for a period of about one minute in an aqueous acidic electrolyte consisting essentially of from about 10 to 200 grams/liter oxalic acid, anionic aluminum, and the balance water, said electrolyte being at a temperature from about 50 to about 80° C.

References Cited

The Anodic Treatment of Al in $H_2SO_4$ solutions, by Spooner, J.E.C.S., vol. 102, No. 4, April 1955, p. 156.

The Surface Treatment of Al, by Wernick et al., 1964, pp. 347, 365.

Electroplating and Metal Finding, Kape, November 1961, pp. 408–410.

JOHN H. MACK, Primary Examiner

R. L. ANDREWS, Assistant Examiner